US010034262B2

(12) United States Patent
Kamthe (10) Patent No.: US 10,034,262 B2
(45) Date of Patent: Jul. 24, 2018

(54) BEACON SENSOR BASED NETWORK FINGERPRINT

(71) Applicant: Aruba Networks, Inc., Sunnyvale, CA (US)

(72) Inventor: Ankur Kamthe, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 90 days.

(21) Appl. No.: 15/336,675

(22) Filed: Oct. 27, 2016

(65) Prior Publication Data

US 2018/0124732 A1    May 3, 2018

(51) Int. Cl.
  *H04W 24/00* (2009.01)
  *H04W 64/00* (2009.01)
  *H04W 40/24* (2009.01)
  *H04W 24/10* (2009.01)

(52) U.S. Cl.
  CPC ........... *H04W 64/00* (2013.01); *H04W 24/10* (2013.01); *H04W 40/244* (2013.01)

(58) Field of Classification Search
  None
  See application file for complete search history.

(56) References Cited

U.S. PATENT DOCUMENTS

| 2014/0087752 | A1 | 3/2014 | Zhu et al. |
| 2014/0179341 | A1 | 6/2014 | Sydir et al. |
| 2014/0179352 | A1 | 6/2014 | Mubeesh et al. |
| 2015/0327022 | A1* | 11/2015 | Lin ........................... G01S 5/02 455/456.1 |
| 2016/0084936 | A1* | 3/2016 | Smith ................... H04W 4/029 455/456.1 |

OTHER PUBLICATIONS

IEEE Computer Society, "Part 11: Wireless LAN Medium Access Control (MAC) and Physical Layer (PHY) Specifications; IEEE Std 802.11-2012", Mar. 29, 2012, 63 pages, IEEE, USA.
Wi-Fi Alliance, "Wi-Fi Peer-to-Peer (P2F) Technical Spec. V. 1.5", Aug. 4, 2014, 13 pages, WiFi Alliance, USA.
Wi-Fi Alliance, "Wi-Fi Certified Wi-Fi Direct: Personal, portable Wi-Fi to connect devices anywhere, anytime", Sep. 2014, 8 pages, WiFi Alliance, USA.

(Continued)

*Primary Examiner* — Suhail Khan
(74) *Attorney, Agent, or Firm* — Brooks, Cameron & Huebsch, PLLC (57) ABSTRACT

Example implementations relate to beacon sensor based network fingerprints. For example, a location analytics device for beacon sensor based network fingerprints may include a processing resource and a memory resource storing readable instructions. The instructions may cause the processing resource to receive signal strength readings from a plurality of access points (APs) for transmissions originating from a target client device, compare the received signal strength readings for the target client device, to a beacon sensor based network fingerprint generated from a reference client device, and determine a location of the target client device based on the comparison of the received signal strength and the beacon sensor based network fingerprint.

15 Claims, 5 Drawing Sheets

(56) References Cited

OTHER PUBLICATIONS

IEEE Computer Society, "IEEE Standard for Air Interface for Broadband Wireless Access Systems; IEE Std 802.16-2012", Aug. 17, 2012, 3 pages, IEEE, USA.
Bluetooth, "Specification of the Bluetooth System", Dec. 2, 2014, 3 pages, Covered Core Package version 4.2, Bluetooth SIG Inc., USA.
IEEE Computer Society, "IEEE Standard for Local and Metropolitan Area Networks: Overview and Architecture; IEEE Std 802-2014", Jun. 12, 2014, 18 pages, IEEE, USA.
Wikipedia, https://en.wikipedia.org/wiki/Internet_Protocol, "Internet Protocol", Jan. 1, 2015, 6 pages, Wikipedia, USA.
USB Technology, http://www.usb.org/developers/docs/, "USB 3.1 Specification" Jul. 26, 2013, 37 pages, USB Implementers Forum Inc, USA.
Wikipedia, https://en.wikipedia.org/wiki/Asynchronous_Transfer_Mode, "Asynchronous Transfer Mode", Dec. 31, 2014, 11 pages, Wikipedia, USA.
Hyung et al: "Inverse Fingerprinting: Sewer Side Indoor Localization with Bluetooth Low Energy". 2016 IEEE 27th Annual International Sympostum on Personal Indoor and Mobile.

\* cited by examiner

BEACON SENSOR BASED NETWORK FINGERPRINT

BACKGROUND

The location of a wireless device such as a mobile user terminal may be determined with respect to a location network comprising multiple known points. These known points may be wireless nodes whose locations are known a priori. These nodes may thus act as reference for identification of a location of the wireless device. The location of the mobile device may be determined relative to the location network using techniques such as trilateration, multilateration, triangulation, and/or a fingerprint based technique, where current measurements are compared to a "fingerprint" of previously sampled measurements taken at known locations throughout the environment.

DETAILED DESCRIPTION

In Wi-Fi enterprise networks, network-centric localization approaches (NCLAs) may use wireless access points to identify an unknown location of a client device. That is, NCLAs may use data collected by the infrastructure wireless access points to identify the unknown location of the client device. As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. However, such approaches may not take into account the variation introduced by a dynamic environment. That is, device may move within the network which may make location determination more difficult and/or inaccurate.

Fingerprinting may provide a wireless map of the operational environment of a network. The wireless map may allow NCLAs to account for environmental factors which affect radio frequency (RF) propagation such as attenuation, interference, and multi-path transmissions, among other examples, thereby affecting the fidelity of the localization operation.

While collecting fingerprinting data, environmental factors that affect RF propagation may be dynamic and change over time. In other words, the wireless map may itself change over a period of time. Despite this fact, in some approaches, network mapping may be performed at the time of deployment of the wireless infrastructure, or at best repeated a few times post-deployment, due to the labor intensive nature of performing network mapping. The sparsity of network mapping data may directly affect localization operations and make them more prone to inaccuracies.

In contrast, in accordance with the present disclosure, a beacon sensor based network fingerprint may be generated by crowd-sourcing data from mobile device users. This beacon sensor based network fingerprint may be generated for various time points. As used herein, a beacon sensor based network fingerprint refers to a map of network devices, generated with at least access point data and beacon sensor data. As used herein, a 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. The beacon sensor based network fingerprint, as described herein, may provide location ground truth data using an overlay network of beacons. By combining beacon sensor data with wireless data from a device involved in fingerprinting, a NCLA may improve the fidelity of its data by accounting for dynamic environment factors. That is, the beacon sensor based network fingerprint may allow for location identification of mobile devices for which beacon sensor data is not available.

As described herein, beacon sensor based network fingerprinting of an environment may be performed periodically, resulting in an increased temporal density of fingerprinting data. This in turn may improve the accuracy of network-centric localization operations.

Figure 1:
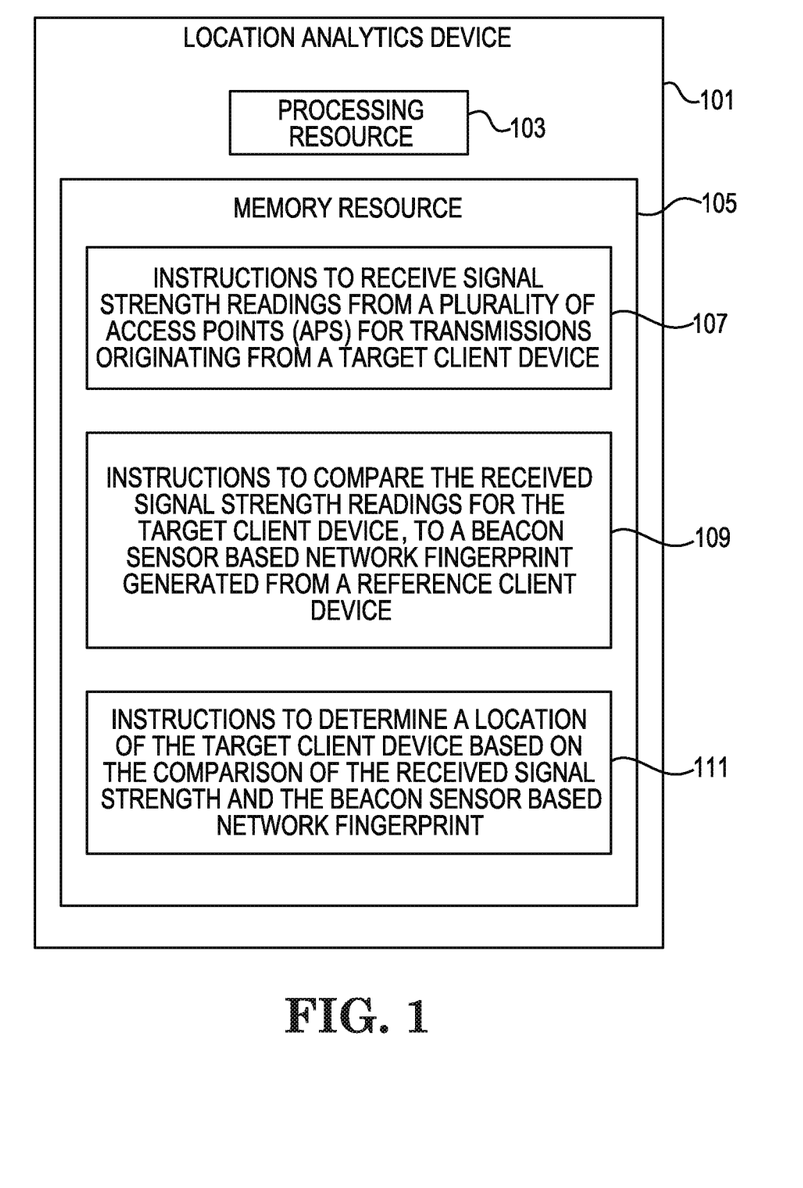
FIG. 1 illustrates an example location analytics device, consistent with the present disclosure.

FIG. 1 illustrates an example location analytics device 101, consistent with the present disclosure. As described herein, the components illustrated in FIG. 1 may perform a number of functions related to beacon sensor based network fingerprints. Although the following descriptions refer to a single processing resource 103 and a single memory resource 105, the descriptions may also apply to a system with multiple processing resources and multiple memory resources. In such examples, the location analytics device 101 may be distributed across multiple memory resources and multiple processing resources. Put another way, the instructions executed in the location analytics device 101 may be stored across multiple machine-readable storage mediums and executed across multiple processing resources, such as in a distributed or virtual computing environment.

As illustrated in FIG. 1, the location analytics device 101 may comprise a memory resource 105 storing non-transitory machine-readable instructions to cause a processing resource 103 to perform a number of operations relating to beacon sensor based network fingerprints. That is, using the processing resource 103 and the memory resource 105, beacon sensor based network fingerprints may be managed by location analytics device 101. Processing resource 103 may be a central processing unit (CPU), microprocessor, and/or other hardware device suitable for retrieval and execution of instructions stored in a machine-readable storage medium such as memory resource 105. The location analytics device 101 may refer to a device that provides functionality for other programs and/or devices, as described herein. As such, location analytics device 101 may be referred to as a server, though examples are not so limited.

The location analytics device 101 may include instructions 107 executable by the processing resource 103 to receive signal strength readings from a plurality of access points (APs) for transmissions originating from a target client device. In accordance with examples of the present disclosure, a wireless network may be comprised of APs deployed in an arrangement such that at any location within the network, multiple APs may be capable of receiving packet transmissions from client devices. The APs may report the signal strength of packet transmissions originating from client devices to a central location such as the location analytics device 101.

The location analytics device 101 may include instructions 109 executable by the processing resource 103 to compare the received signal strength readings for the target client device, to a beacon sensor based network fingerprint generated from a reference client device. That is, a beacon sensor based network fingerprint may be generated, and used for comparison against signal strength readings associated with a client device. As described further herein, the location analytics device may collate data from multiple APs to provide detailed analytics regarding client device behavior. That is, the location analytics device 101 may collate data from multiple APs and other data sources. Moreover, the location analytics device may determine the location of a client device using the signal strength information, and compare signal strength data for a device with an unknown location with the collated data. As used herein, 'information' is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

The location analytics device 101 may include instructions 111 executable by the processing resource 103 to determine a location of the target client device based on the comparison of the received signal strength and the beacon sensor based network fingerprint. As used herein, a target client device refers to a device for which a location is not known, and is to be determined. The target client device may or may not be connected to the wireless infrastructure network, such that the location analytics device may or may not have access to the target device's location. In such an example, the location analytics device 101 may determine a location of the target client device by correlating signal strength of the target client device with the beacon sensor based network fingerprint. That is, the location analytics device may compare a signal strength vector of the target client device with a signal strength vector of a device with a known location, and determine the location of the target client device based on the comparison of the signal strength vectors. Put another way, in some examples, the instructions to determine the location of the target client device may include instructions to cause the processing resource to correlate a signal strength vector of a reference client device to a signal strength vector of the target client device. As used herein, a reference client device refers to a device for which a location within the network is known.

In some examples, as discussed further herein, the location analytics device 101 may also include instructions executable by the processing resource 103 to cause the processing resource to receive from a master controller, packet transmission data from the plurality of APs for transmissions originating from the target client device. That is, the location analytics device may be communicatively coupled to a master controller that receives packet transmission data from the plurality of APs originating from the target client device.

Figure 2:
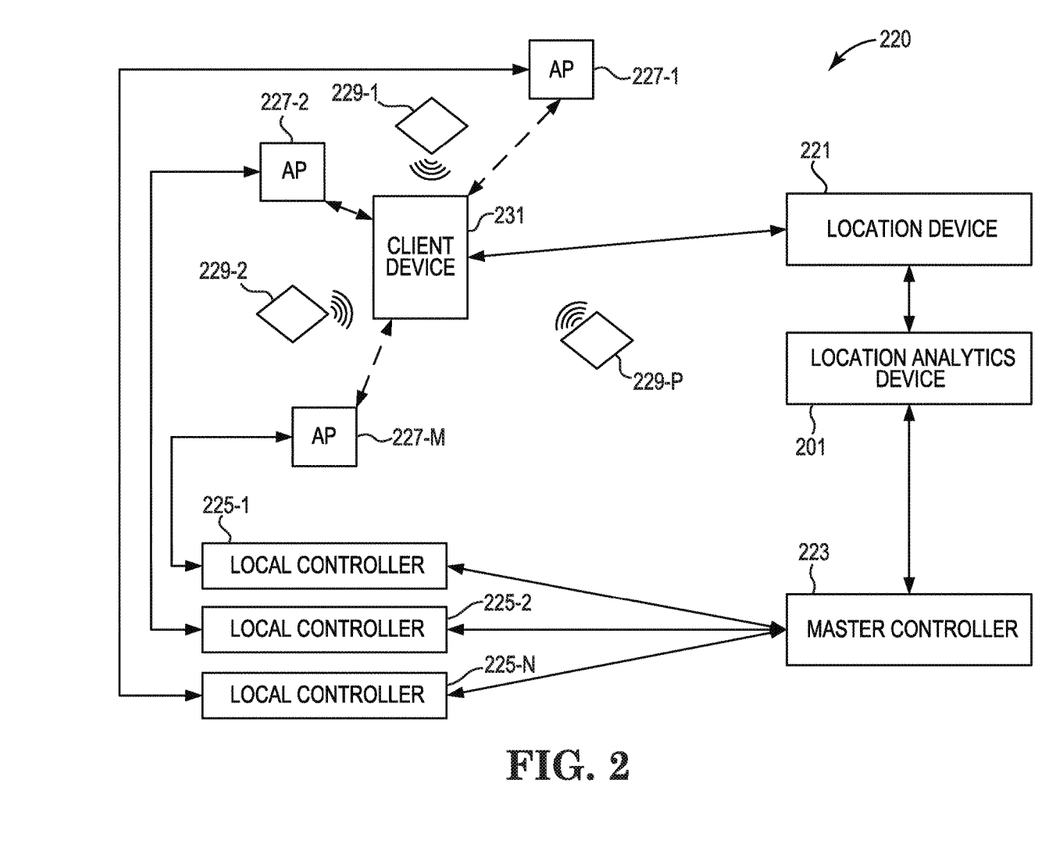
FIG. 2 illustrates an example environment, consistent with the present disclosure.

FIG. 2 illustrates an example environment 220 consistent with the present disclosure. As illustrated in FIG. 2, the environment 220 may include a location analytics device 201, a location device 221, a master controller 223, a plurality of local controllers 225-1, 225-2 . . . 225-N (referred to herein as local controllers 225), a plurality of APs 227-1, 227-2 . . . 227-M (referred to herein as APs 227), and a plurality of beacon sensors 229-1, 229-2 . . . 229-P (referred to herein as beacon sensors 229). A reference client device, such as reference client device 231 may be in environment 220. The reference client device 231 may execute instructions that allow location device 221 to determine its location, and may also be connected to the infrastructure of environment 220. That is, reference client device 231 may execute instructions that allow the location device 221 to determine the location of reference client device 231. Moreover, transmissions of the reference client device 231 may be overheard by multiple APs 227. That is, reference client device 231 may have wireless traffic flowing through at least one of the APs 227.

The reference client device 231, alone or in collaboration with the location device 221, may determine its location within environment 220. That is, the reference client device 231 may hear beacons from the beacon sensors 229. The reference client device 231 may determine its location locally, e.g., on the reference client device 231, and/or the reference client device 231 may convey beacon sensor data to the location device 221 and the location device 221 may determine the location of the reference client device 231 using the beacon sensor data. As used herein, beacon sensor data refers to data received by reference client device 231 from beacon sensors 229. An example of beacon sensor data may include Bluetooth Low Energy (BLE) proximity sensing data. The beacon sensors 229 may use BLE proximity sensing to transmit a unique identifier that may be used by a receiving device to determine a location of the receiving device. Although BLE is provided as one example of beacon sensor data, examples are not so limited and the beacon sensors 229 may use other operations to allow for location detection of a device.

The location analytics device 201 may receive from the location device 221, the location of the reference device 231, based on the beacon sensor data. The location analytics device 201 may also receive from the master controller 223, access point data from APs 227, local controllers 225, and master controller 223. As used herein, access point data refers to packet transmission data for transmissions between the reference device 231 and APs 227. The access point data may include received signal strength indicator (RSSI) data, Time-of-Flight (ToF) data, Time-of-Arrival (ToA) data, and/or Angle-of-Arrival (AoA) data, among other examples. The location analytics device 201 may then generate a beacon sensor based network fingerprint by combining the access point data received from the master controller 223 with the beacon sensor data received from the location device 221. Although it is described herein that APs may communicate with the location analytics device through local controllers and master controllers, examples are not so limited, and in some examples the APs may communicate with the location analytics device 201 independent of a controller, thereby bypassing the controller.

That is, referring to FIG. 2, a network of beacon sensors 229 may be deployed in environment 220. A subset of client devices in environment 220 may be executing instructions that are capable of reporting signal strengths of beacons heard from the beacon sensors 229. These readings may then be transmitted along with a unique identifier such as a MAC address, to the location device 221, which may determine the location of each respective client device. At the same given time, data frames from each respective client device (such as reference client device 231) may be overheard by APs 227 and their signal strengths may be reported to the location analytics device 201. The beacon sensor based network fingerprint may be generated as a combination of these data sets.

In some examples, the location analytics device 201 may poll the location device 221 at a particular point in time to obtain the location of a particular client device, using the unique identifier of the particular client device (such as a MAC address for the particular client device). The location of the particular client device may then be correlated to the signal strength readings collected from the different APs 227 at the instant that the location device 221 measured the location of the particular client device. Responsive to such measurement, the location analytics device 201 may generate a beacon sensor based network fingerprint for that particular point in time from the signal strength reading and the location information obtained from the location device 221. Since the access point data and the beacon sensor data may be provided to the location analytics device 201 at various times throughout a day, the location analytics device 201 may maintain a beacon sensor based network fingerprint for different times of day, and may rebuild this data for a given time interval.

Figure 3:
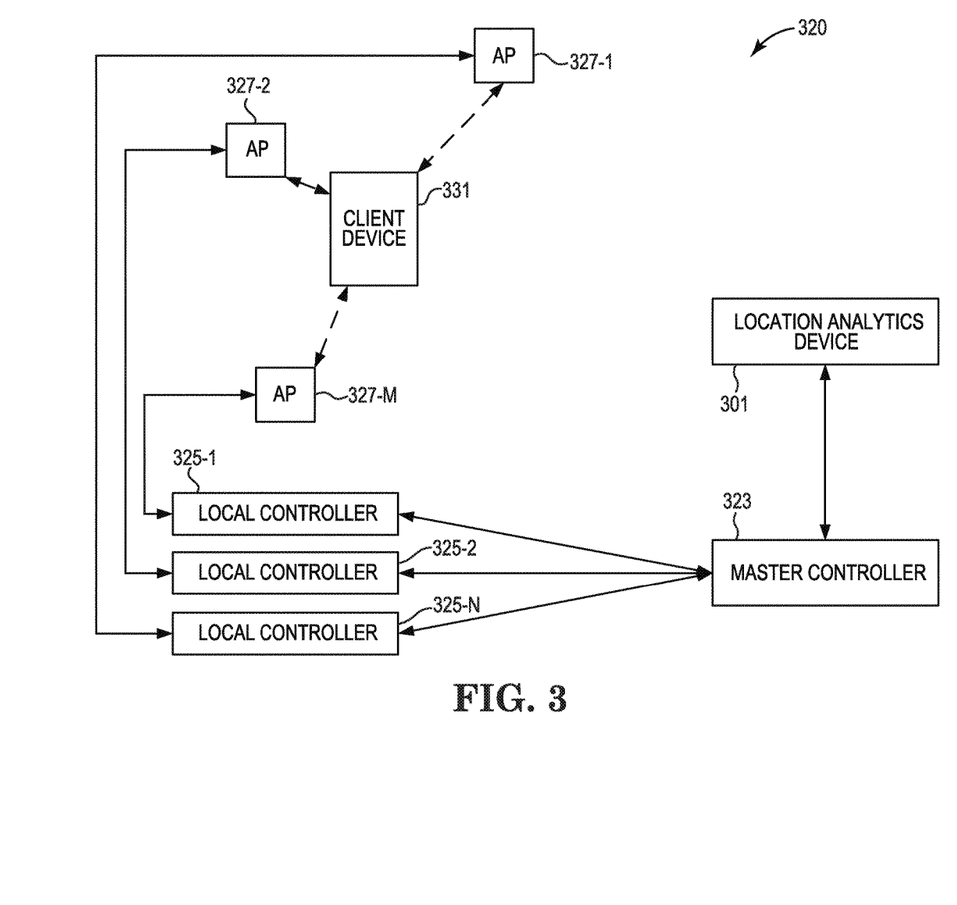
FIG. 3 further illustrates an example environment, consistent with the present disclosure.

FIG. 3 further illustrates an example environment 320 consistent with the present disclosure. Environment 320 may be analogous to environment 220 illustrated in FIG. 2. As illustrated in FIG. 3, the environment 320 may include a location analytics device 301, a master controller 323, a plurality of local controllers 325-1, 325-2 . . . 325-N (referred to herein as local controllers 325), and a plurality of APs 327-1, 327-2 . . . 327-M (referred to herein as APs 327). A target client device, such as target client device 340 may be in environment 320. The target client device 340 may or may not be connected with the wireless infrastructure described in relation to FIG. 2. That is, the target client device 340 may or may not be connected to location device 221 illustrated in FIG. 2. In such examples, the location analytics device 301 may not have access to the location of the target client device 340 from the location device 221. However, the location analytics device 301 may receive access point data, e.g., signal strength readings, from APs 327 for transmissions originating from the target client device 340. In other words, transmissions of the target client device 340 may be overheard by multiple APs 327. The location analytics device 301 may receive the access point data from master controller 323, and may correlate the access point data with the previously generated beacon sensor based network fingerprint to determine the location of target client device 340. That is, the location analytics device 301 may compare the access point data for the target client device 340 with the access point data for a plurality of reference client devices in the beacon sensor based network fingerprint, and identify a location of the target client device based on this comparison. As described herein, a different beacon sensor based network fingerprint may be generated for different times of day, different days, etc. to improve the accuracy of location determination.

Figure 4:
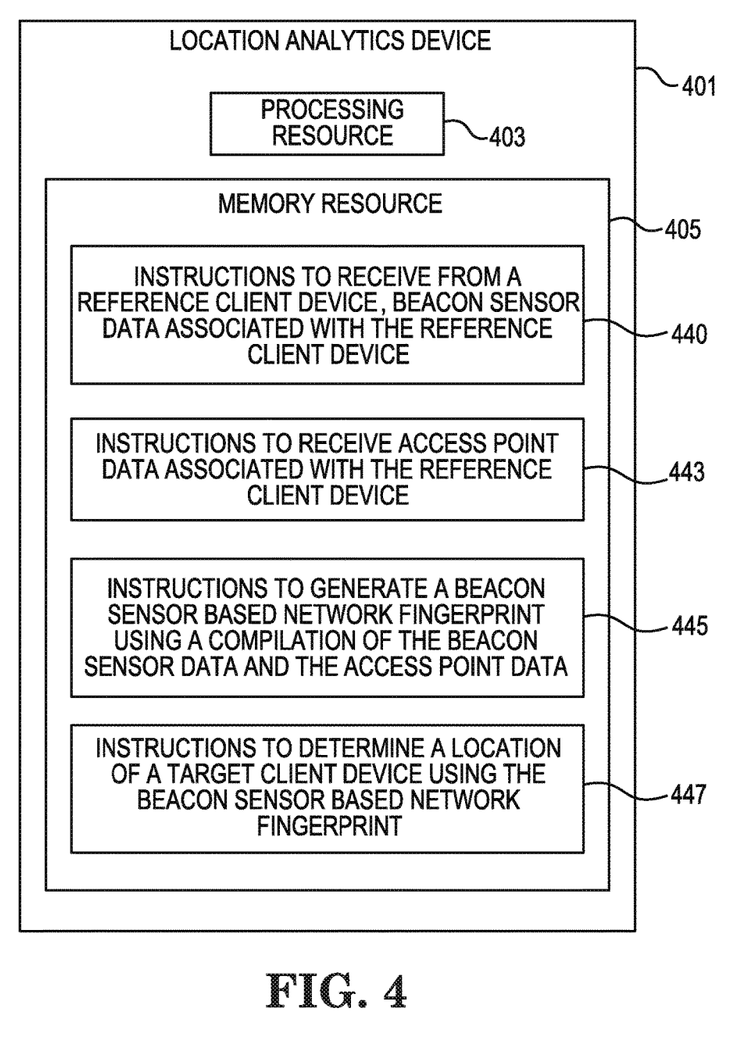
FIG. 4 further illustrates an example location analytics device, consistent with the present disclosure.

FIG. 4 further illustrates an example location analytics device 401, consistent with the present disclosure. The location analytics device 401 may be analogous to the location analytics device 101 illustrated in FIG. 1, the location analytics device 201 illustrated in FIG. 2, and the location analytics device 301 illustrated in FIG. 3.

The location analytics device 401 may include instructions 441 executable by the processing resource 403 to receive from a reference client device, beacon sensor data associated with the reference client device. That is, the location analytics device may receive from a location device (e.g., location device 221 illustrated in FIG. 2), beacon sensor data associated with a reference client device (such as reference client device 231 illustrated in FIG. 2). That is, the instructions to receive from a reference client device, beacon sensor data associated with the reference client device may include instructions to receive from a location device, beacon sensor data generated by the reference client device. Similarly, the location analytics device may receive from a master controller, access point data for transmissions originating from the reference client device, as described further in relation to FIG. 2.

The location analytics device 401 may include instructions 443 executable by the processing resource 403 to receive access point data associated with the reference client device. That is, as described in relation to FIG. 2, the access point data for transmissions originating from the reference client device may be transmitted to a local controller (e.g., 225 illustrated in FIG. 2), to a master controller (e.g., 223 illustrated in FIG. 2), and to the location analytics device.

The location analytics device 401 may include instructions 445 executable by the processing resource 403 to generate a beacon sensor based network fingerprint using a compilation of the beacon sensor data and the access point data of the reference client device. That is, by combining the received access point data and the received beacon sensor data, a beacon sensor based network fingerprint may be generated for a particular point in time.

The location analytics device 401 may include instructions 447 executable by the processing resource 403 to determine a location of a target client device using the beacon sensor based network fingerprint. As described in relation to FIG. 3, access point data for a target client device, whose location may be unknown, may be compared to the access point data for various devices in the beacon sensor based network fingerprint to determine the location of the target client device.

In some examples, the location analytics device 401 may include instructions executable by the processing resource 403 to receive a location of the reference client device from a location device, and generate the beacon sensor based network fingerprint using the location of the reference client device. For example, as described in relation to FIG. 2, the location analytics device 401 may receive the location of the reference client device from the location device. In some examples, the location of the reference client device may be determined by the location device. Examples are not so limited, however, and the location of the reference client device may be determined by the reference client device.

In some examples, the location analytics device 401 may include instructions executable by the processing resource 403 to receive from a master controller, access point data of the target client device, and determine the location of the target client device using the beacon sensor based network fingerprint and the access point data of the target client device. For instance, as described in relation to FIG. 3, the location of a particular client device may be determined by comparing access point data for the particular client device to information contained in the beacon sensor based network fingerprint.

The location analytics device 401 may include instructions executable by the processing resource 403 to receive from a plurality of reference client devices, beacon sensor data, receive access point data associated with the plurality of reference client devices, and generate the beacon sensor based network fingerprint using a compilation of the beacon sensor data and access point data of the plurality of reference client devices. That is, while reference is made herein to a single reference client device used to generate a beacon sensor based network fingerprint, examples are not so limited, and the beacon sensor based network fingerprint may be generated using multiple reference client devices.

Figure 5:
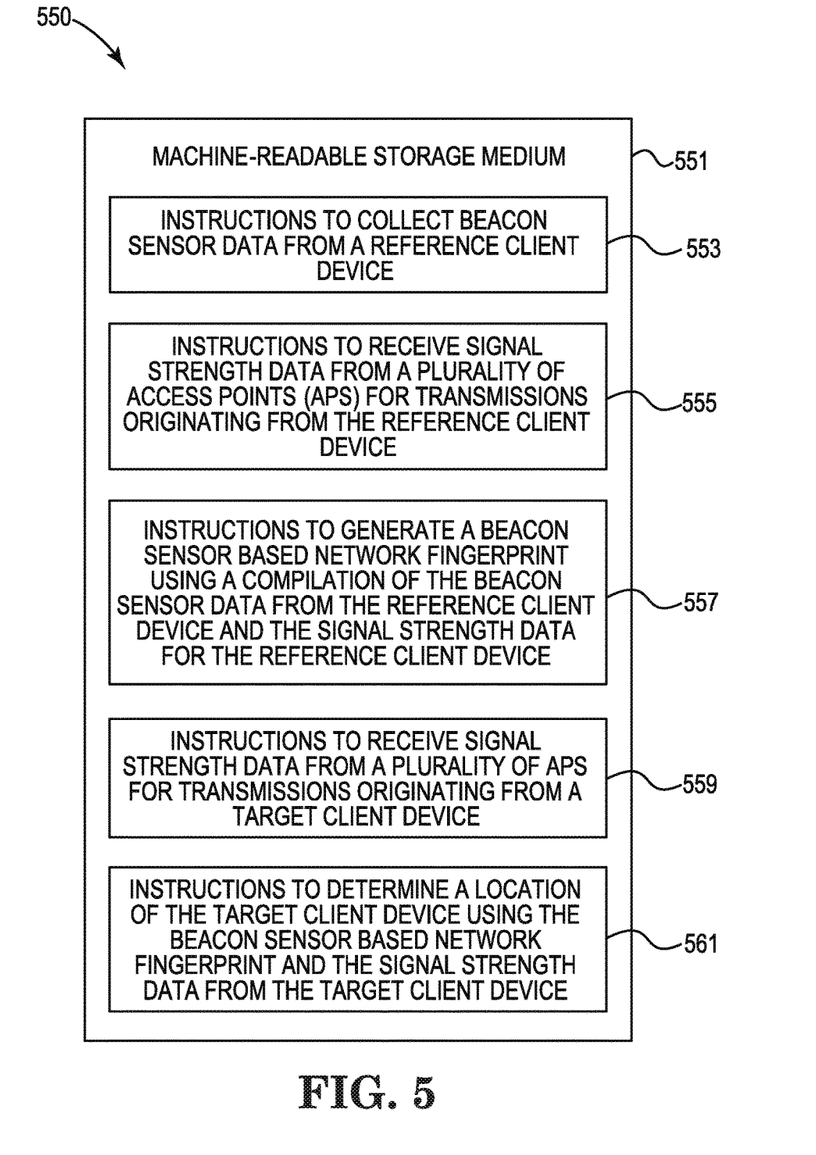
FIG. 5 illustrates another example environment for beacon sensor based network fingerprints, consistent with the present disclosure.

FIG. 5 illustrates another example environment 550 for beacon sensor based network fingerprints, consistent with the present disclosure. As described herein, the components illustrated in FIG. 5 may perform a number of functions related to beacon sensor based network fingerprints. Although the following descriptions refer to a single processing resource and a single machine-readable storage medium 551, the descriptions may also apply to a system with multiple processing resources and multiple machine-readable storage mediums. In such examples, the environment 550 may be distributed across multiple machine-readable storage mediums and multiple processing resources. Put another way, the instructions executed in the environment 550 may be stored across multiple machine-readable storage mediums and executed across multiple processing resources, such as in a distributed or virtual computing environment.

As illustrated in FIG. 5, the environment 550 may comprise a non-transitory machine-readable storage medium 551 storing machine readable instructions to cause a processing resource (not illustrated in FIG. 5) to perform a number of operations relating to beacon sensor based network fingerprints. The processing resource may be a central processing unit (CPU), microprocessor, and/or other hardware device suitable for retrieval and execution of instructions stored in machine-readable storage medium 551.

The environment 550 may include instructions 553 executable by the processing resource to collect beacon sensor data from a reference client device. As described herein, beacon sensor data may be collected from a single reference client device or a plurality of reference client devices. Moreover, the beacon sensor data may be collected during various times of days and on multiple days. In such a manner, beacon sensor data may be collected for a plurality of time points.

The environment 550 may include instructions 555 executable by the processing resource to receive signal strength data from a plurality of APs for transmissions originating from the reference client device. As described in relation to FIGS. 2 and 3, various access points may send and/or receive packet transmissions to and/or from the reference client device and transmit access point data such as RSSI to a location analytics device as described herein.

The environment 550 may include instructions 557 executable by the processing resource to generate a beacon sensor based network fingerprint using a compilation of the beacon sensor data from the reference client device and the signal strength data for the reference client device. The instructions to generate a beacon sensor based network fingerprint may include instructions to generate the beacon sensor based network fingerprint using received signal strength indicator (RSSI) data for the reference client device. However, examples are not so limited, and the instructions to generate a beacon sensor based network fingerprint may include instructions to generate a first beacon sensor based network fingerprint for a first time period and a second beacon sensor based network fingerprint for a second time period. For instance, a first beacon sensor based network fingerprint may be generated for a Monday, while a second beacon sensor based network fingerprint may be generated for a Saturday. In another example, a first beacon sensor based network fingerprint may be generated for a Monday morning at 10:00 am central time, a second beacon sensor based network fingerprint may be generated for a Monday evening at 11:00 pm central time, and a third beacon sensor based network fingerprint may be generated for a Saturday at 12:00 pm central time.

Although RSSI is provided herein as an example of access point data, examples are not so limited. The instructions to generate a beacon sensor based network fingerprint may include instructions to generate the beacon sensor based network fingerprint using Time-of-Flight data for the reference client device. The instructions to generate a beacon sensor based network fingerprint may also include instructions to generate the beacon sensor based network fingerprint using Angle-of-Arrival data for the reference client device.

In some examples, the environment 550 may include instructions 559 executable by the processing resource to receive signal strength data from a plurality of APs for transmissions originating from a target client device, as described in relation to FIG. 3. Moreover, the environment 550 may include instructions 561 executable by the processing resource to determine a location of the target client device using the beacon sensor based network fingerprint and the signal strength data from the target client device, as described herein.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "M", "N", and "P", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:
1. A location analytics device comprising:
a processing resource; and
a memory resource storing machine-readable instructions to cause the processing resource to:
  receive signal strength readings from a plurality of access points (APs) for transmissions originating from a target client device;
  receive from a reference client device, beacon sensor data and access point data associated with the reference client device;
  compare the received signal strength readings for the target client device, to a beacon sensor based net- work fingerprint generated using the beacon sensor data and the access point data of the reference client device; and determine a location of the target client device based on the comparison of the received signal strength readings and the beacon sensor based network fingerprint.

2. The location analytics device of claim 1, including instructions to cause the processing resource to receive from a master controller, packet transmission data from the plurality of APs for transmissions originating from the target client device.

3. The location analytics device of claim 1, wherein the instructions to determine the location of the target client device include instructions to cause the processing resource to correlate a signal strength vector of the reference client device to a signal strength vector of the target client device.

4. A location analytics device comprising:
a processing resource; and
a memory resource storing machine readable instructions to cause the processing resource to:
receive signal strength readings from a plurality of access points (APs) for transmissions originating from a target client device;
receive from a reference client device, beacon sensor data associated with the reference client device;
receive from the reference client device, access point data associated with the reference client device;
generate a beacon sensor based network fingerprint using a compilation of the beacon sensor data and the access point data of the reference client device; and
determine a location of the target client device using the beacon sensor based network fingerprint and the signal strength readings from the target client device.

5. The location analytics device of claim 4, including instructions to cause the processing resource to:
receive a location of the reference client device from a location device; and
generate the beacon sensor based network fingerprint using the location of the reference client device.

6. The location analytics device of claim 5, wherein the location is determined by the location device.

7. The location analytics device of claim 5, wherein the location is determined by the reference client device.

8. The location analytics device of claim 4, including instructions to cause the processing resource to:
receive from a master controller, the access point data of the target client device.

9. The location analytics device of claim 4, wherein the instructions to receive from the reference client device, beacon sensor data and access point data include instructions to:
receive from a location device, beacon sensor data generated by the reference client device; and
receive from a master controller, access point data for transmissions originating from the reference client device.

10. The location analytics device of claim 4, including instructions to cause the processing resource to:
receive from a plurality of reference client devices, beacon sensor data;
receive access point data associated with the plurality of reference client devices; and
generate the beacon sensor based network fingerprint using a compilation of the beacon sensor data and access point data of the plurality of reference client devices.

11. A non-transitory machine-readable medium storing instructions executable by a processing resource to:
collect beacon sensor data from a reference client device;
receive signal strength data from a plurality of access points (APs) for transmissions originating from the reference client device;
generate a beacon sensor based network fingerprint using a compilation of the beacon sensor data from the reference client device and the signal strength data for the reference client device;
receive signal strength data from a plurality of APs for transmissions originating from a target client device; and
determine a location of the target client device using the beacon sensor based network fingerprint and the signal strength data from the target client device.

12. The non-transitory machine readable medium of claim 11, wherein the instructions to generate a beacon sensor based network fingerprint include instructions to:
generate the beacon sensor based network fingerprint using received signal strength indicator (RSSI) data for the reference client device.

13. The non-transitory machine readable medium of claim 11, wherein the instructions to generate a beacon sensor based network fingerprint include instructions to:
generate a first beacon sensor based network fingerprint for a first time period and a second beacon sensor based network fingerprint for a second time period.

14. The non-transitory machine readable medium of claim 11, wherein the instructions to generate a beacon sensor based network fingerprint include instructions to:
generate the beacon sensor based network fingerprint using Time-of-Flight data for the reference client device.

15. The non-transitory machine readable medium of claim 11, wherein the instructions to generate a beacon sensor based network fingerprint include instructions to:
generate the beacon sensor based network fingerprint using Angle-of-Arrival data for the reference client device.

* * * * *